United States Patent
Gras et al.

(10) Patent No.: US 10,132,667 B2
(45) Date of Patent: Nov. 20, 2018

(54) METHOD OF MANUFACTURING AN ELEMENT SENSITIVE TO A PHYSICAL PARAMETER OF A FLOW OF FLUID AND CORRESPONDING SENSITIVE ELEMENT

(71) Applicant: AUXITROL S.A., Bourges (FR)

(72) Inventors: Christian Gras, Saint Doulchard (FR); Catherine Donat, Mehun sur Yevre (FR)

(73) Assignee: AUXITROL S.A., Bourges (FR)

( * ) Notice: Subject to any disclaimer, the term of this patent is extended or adjusted under 35 U.S.C. 154(b) by 71 days.

(21) Appl. No.: 15/126,252

(22) PCT Filed: Mar. 17, 2015

(86) PCT No.: PCT/EP2015/055583
§ 371 (c)(1),
(2) Date: Sep. 14, 2016

(87) PCT Pub. No.: WO2015/140182
PCT Pub. Date: Sep. 24, 2015

(65) Prior Publication Data
US 2018/0031402 A1    Feb. 1, 2018

(30) Foreign Application Priority Data
Mar. 17, 2014    (FR) .................................... 14 52188

(51) Int. Cl.
*B05D 5/12*    (2006.01)
*G01F 1/69*    (2006.01)
(Continued)

(52) U.S. Cl.
CPC ................. *G01F 1/69* (2013.01); *B05D 1/18* (2013.01); *G01K 1/08* (2013.01); *G01K 7/16* (2013.01);
(Continued)

(58) Field of Classification Search
CPC combination set(s) only.
See application file for complete search history.

(56) References Cited

U.S. PATENT DOCUMENTS

| | | | | |
|---|---|---|---|---|
| 5,161,894 A | * | 11/1992 | Bourigault | ............... G01K 7/18 338/28 |
| 5,181,799 A | * | 1/1993 | Carruba | .................. E02B 17/00 166/367 |
| 2012/0330311 A1 | * | 12/2012 | McNall, III | ....... A61B 18/1485 606/46 |

FOREIGN PATENT DOCUMENTS

| | | |
|---|---|---|
| EP | 0332110 A2 | 9/1989 |
| EP | 0447295 A1 | 9/1991 |

(Continued)

OTHER PUBLICATIONS

International Search Report in PCT/EP2015/055583 dated Jul. 9, 2015, with English translation. 5 pages.

(Continued)

*Primary Examiner* — Austin Murata
(74) *Attorney, Agent, or Firm* — Womble Bond Dickinson (US) LLP

(57) ABSTRACT

The invention relates to a method of manufacturing an element sensitive to at least one physical parameter of a flow of fluid, comprising a step consisting in a single cycle of immersing, in molten glass, a core of a preassembled sensitive element, said core comprising at least two longitudinal channels along which there pass longitudinally at least two conducting connecting wires which are connected to an at least two-wire winding, said winding being suited to forming a resistive or inductive circuit for detecting said physical parameter, said immersion allowing the connecting wires to be sealed into the channels, allowing said channels to be filled and allowing the outside of the core to be coated in a single immersion, the core, at the end of said single (Continued)

immersion cycle, being sealed and coated in such a way as to obtain an assembled sensitive element. Advantageously, the winding may be "corkscrew" wound inside the longitudinal channels, immersion allowing the connecting wires to be held on the winding and controlling the space between the turns of the winding.

9 Claims, 6 Drawing Sheets

(51) Int. Cl.
*G01K 1/08* (2006.01)
*G01K 7/16* (2006.01)
*G01K 13/02* (2006.01)
*H01C 1/028* (2006.01)
*B05D 1/18* (2006.01)
C03B 25/02 (2006.01)
H01C 17/00 (2006.01)
H01F 27/28 (2006.01)
H01F 41/06 (2016.01)

(52) U.S. Cl.
CPC ............ *G01K 13/02* (2013.01); *H01C 1/028* (2013.01); *C03B 25/02* (2013.01); *H01C 17/00* (2013.01); *H01F 27/2823* (2013.01); *H01F 41/06* (2013.01)

(56) References Cited

FOREIGN PATENT DOCUMENTS

| FR | 890 176 A | 1/1944 |
|----|-----------|--------|
| FR | 2 822 542 A1 | 9/2002 |
| JP | 2005 045175 A | 2/2005 |
| JP | 5 216947 B1 | 6/2013 |

OTHER PUBLICATIONS

Search Report in French Application No. 1452188 dated Dec. 12, 2014, with English translation coversheet. 3 pages.

* cited by examiner

FIG. 3
FIG. 4
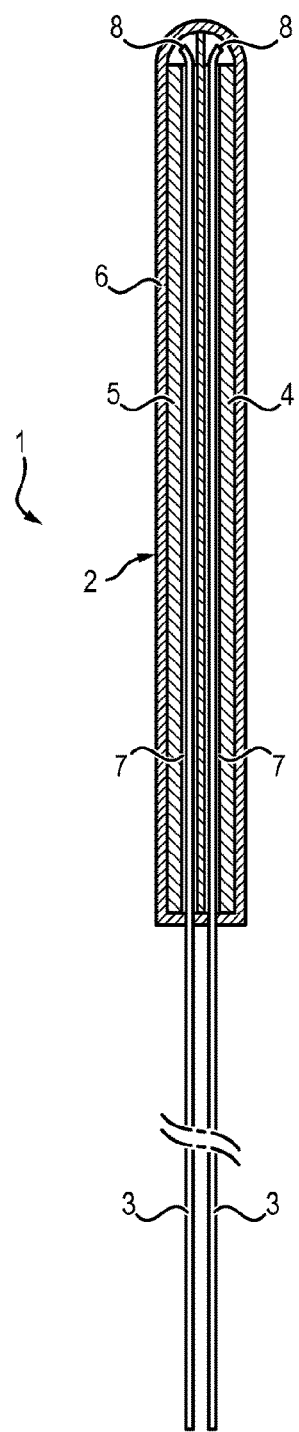
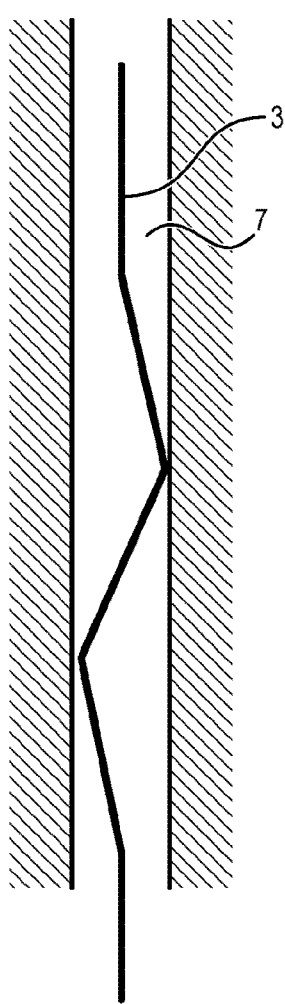

METHOD OF MANUFACTURING AN ELEMENT SENSITIVE TO A PHYSICAL PARAMETER OF A FLOW OF FLUID AND CORRESPONDING SENSITIVE ELEMENT

GENERAL TECHNICAL FIELD

The invention relates to a method for manufacturing a sensitive element of a device for measuring at least one physical parameter of a fluid flow such as temperature, vibration, velocity, or pressure. Such a measuring device has applications in aeronautics in particular.

PRIOR ART

An element sensitive to at least one physical parameter of a fluid flow must be capable of operating, particularly in aeronautics, in an aggressive environment while withstanding temperature variations, supply current variations, shocks, vibrations, pressure and flow forces of the fluid as well as possible.

Sensitive elements are known comprising an oblong mandrel through which pass longitudinally conductive connecting wires which connect to a mono- or bifilar winding wound on the outer surface of the core and an insulating glass coating surrounding the oblong core and its mono- or bifilar winding.

To manufacture such sensitive elements, a mixture of glass and water is applied with a brush to the wound core and into the longitudinal channels through which the connecting wires pass, in order to seal the conductive connecting wires inside the channels. The core is then dried and baked in a kiln. Such an operation is repeated several times in order to guarantee good-quality coating and sealing.

During manufacturing, to coat the outside with glass, the wound core is immersed in a mixture of glass and water at ambient temperature then dried and kiln-baked. Again, such an operation is repeated several times to obtain a desired thickness of glass.

In situations where this immersion cannot be done, the outer glass coating can be produced by using a brush to apply the glass and water mixture at ambient temperature, then also dried and kiln-baked. Again, such an operation is repeated several times to obtain a desired thickness of glass.

During manufacturing, to seal the connecting wires inside the core holes, a ceramic slip (a mixture of water at ambient temperature and vitreous and/or crystalline oxides) is introduced into the holes, by immersion in the slip and exposure to a vacuum and/or with the brush, then dried and kiln-baked once more. According to the method, such an operation can be repeated several times to obtain the desired sealing quality.

One problem is that such a method is complex as it has many steps that must be repeated several times. The sealing of the ends inside the channels could be improved as it is difficult, with a slip, to replace the channels once this slip is baked, which weakens the sensitive element.

PRESENTATION OF THE INVENTION

The invention solves the problems mentioned above, and for this purpose proposes a method for manufacturing an element sensitive to at least one physical parameter of a fluid flow, comprising a single immersion cycle making it possible for a pre-assembled sensitive element to become an assembled sensitive element, the single immersion cycle comprising immersion of a core of the pre-assembled sensitive element in molten glass, i.e. in liquid form and at high temperature, said core comprising at least two longitudinal channels through which pass longitudinally at least two conductive connecting wires connecting to an at least bifilar winding, said winding being suitable for forming a resistive or inductive circuit for detecting said physical parameter, said immersion making it possible to seal the connecting wires (3) inside the channels, fill said channels and coat the outside of the core in a single immersion, the core being, at the end of said single immersion cycle, sealed and coated, the single immersion cycle comprising a step of partial immersion, at a slow speed, of the core in the molten glass followed by a step of complete immersion, at a fast speed, of the core in the molten glass.

The invention is advantageously completed by the following features, taken alone or in any one of their technical possible combinations.

The bifilar winding is wound on the outer surface of the core, the immersion making it possible to coat the outside of the core thus wound.

The winding is "corkscrew" wound inside the longitudinal channels, the immersion making it possible to hold the connecting wires in place on the winding and control the space between the turns of the winding.

The pre-assembled sensitive element comprises a tube surrounding the core, said tube being preferably made of glass or ceramic, said tube making it possible to control the minimum thickness of the coating during immersion.

The single immersion cycle comprises a step of pre-heating and cleaning of the pre-assembled sensitive element consisting in positioning said pre-assembled sensitive element close to the molten glass so that it reaches a temperature close to said molten glass.

The single immersion cycle comprises a step of slow extraction of the core from the molten glass followed by a step of quick extraction of the core from the hot area of the kiln.

The method comprises, following the step consisting in a single immersion cycle, a step of stabilization of the electrical behavior of the assembled sensitive element by stress-relieving by annealing the glass at a moderate and controlled temperature in order to obtain the final sensitive element.

The connecting wires and the winding are made of platinum alloy and the core is made of partially or totally stabilized zirconium, for example by adding yttrium oxide or magnesium oxide.

The molten glass has a temperature between 400° C. and 1200° C., typically 950° C.

The invention also relates to a sensitive element obtained by a method according to the invention as well as a measuring device, comprising one such sensitive element.

The invention therefore consists in using a molten glass with features perfectly adapted to the core, preferably ceramic, to the material of the connecting wires and the winding (hot viscosity, controlled expansion, elasticity, quenching suitability, chemical aggressiveness, etc.) and immerse the core in the molten glass so as to cause during the same operation:
- the sealing of the connecting wires by the glass rising in the longitudinal channels (enough passing through and/or capillarity of the liquid glass);
- any possible plugging of the unused channels (if the cores are standardized);
- the coating of the outside by surface tension of the liquid glass on the core.

If the winding is "corkscrew", inside the core, the latter is protected inside the holes of the core (two or four holes) but held in place with the connecting wires by immersion in the molten glass. This makes it possible to gradually fill the holes without mechanically stressing the turns of the corkscrew winding, until the connecting wires are effectively sealed.

Specifically, when the core is made of zirconium and the connecting wires made of platinum, the thermal expansion coefficient of zirconium being close enough to that of platinum, the turns can be held in place by a "rigid" material such as glass rather than a "flexible" one such as a compacted powder in which the grains are not chemically bonded together, thus improving the behavior under high vibrational stress and making it possible to easily guarantee a very high dielectric between the resistive circuit and the outer surface of the core. Moreover, by using a platinum wire initially covered with a layer of ceramic enamel of just a few micrometers (adhered directly to the platinum or via very fine electrical bonding of the platinum by a more easily oxidizable metal such as nickel for example), the calibration of the electrical resistance of the element could be done "on the straight part", before the connecting wires and the turns are even inserted into the holes of the ceramic core. In addition, in such a configuration, the ceramic core is no longer necessarily either of elongated shape, nor of constant cross section. This alternative would thus make it possible to also optimize the shape of the ceramic in relation to the area to be measured, to its mechanical assembly on the body of the sensor or any other geometrical constraint. This ceramic part could furthermore be obtained by extrusion like our current cores but also by CIM (Ceramic Injection Molding) or machining into a dense bulk material.

If the sensitive element comprises a glass or ceramic tube, the latter can bear higher dielectric stresses while reducing manufacturing costs. This design has the main advantages of
- keeping the current ceramic cores and simplifying the machining of the central ceramic core (stress-relieving until the channels appear requires less dexterity and time than producing a hemispherical end);
- avoiding "blind" handling of the wound wires/connecting wires;
- guaranteeing a high dielectric between the winding and the outside:
  - radially: minimum thickness of tube insulant and glass
  - axially: excess length of the core in relation to the wires.

Furthermore, owing to the thickness of the tube, the molten glass no longer has to form a significant thickness of outer coating.

Advantageously, the use of a very fluid glass makes it possible to reduce the thickness of this outer coating and hence even irregularities (water drop effect.) Capillary effects make it possible to hold this very fluid glass in place inside the filled inner volumes.

The invention also proposes a sensitive element obtained by a method according to the invention.

Finally, the invention also proposes a measuring device comprising a sensitive element according to the invention.

OVERVIEW OF THE FIGURES

Other features, aims and advantages of the invention will become apparent from the following description, which is purely illustrative and non-limiting, and which must be read with reference to the appended drawings wherein:

FIG. 3 illustrates a section view of a sensitive element according to the invention;

FIG. 4 illustrates a partial view of a longitudinal channel comprising a conductive wire of a sensitive element according to the invention;

On all the figures similar elements bear identical reference numbers.

DETAILED DESCRIPTION OF THE INVENTION

Figure 1:
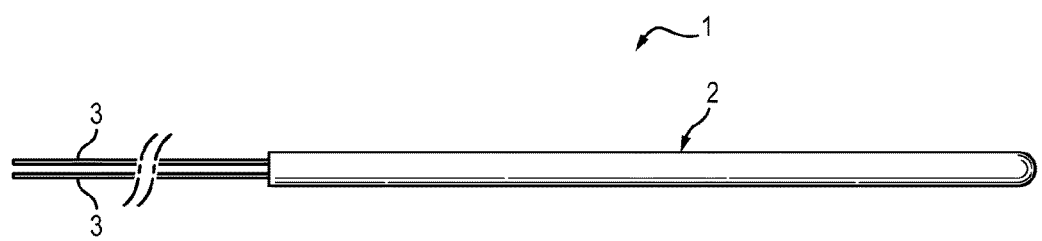
FIG. 1 illustrates a general view of a sensitive element according to the invention.

With reference to FIG. 1, an element 1 sensitive to at least one physical parameter of a fluid flow comprises an oblong body 2 from which conductive connecting wires 3 extend.

Figure 2:
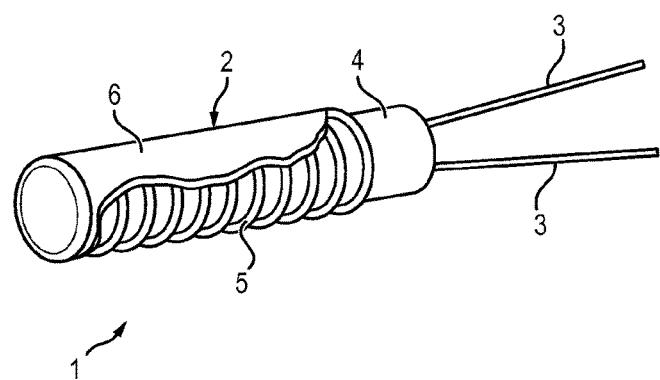
FIG. 2 illustrates a perspective view of a sensitive element according to the invention.

With reference to FIG. 2, the oblong body 2 particularly comprises an oblong core 4 through which there pass longitudinally the conductive connecting wires 3 which connect to a winding 5 which is at least bifilar depending on the number of connecting wires 3 composed of conductive wires wound around the core 4.

As can be seen in FIG. 2, the winding 5 is wound on the outer surface of the core 4.

An insulating coating made of glass or glass-ceramic 6 surrounds the oblong core 4 and its winding 5, to ensure the strength of the wires and the watertightness of the element to the outside environment. The glass or glass-ceramic insulating coating is obtained by immersing the core 4 in a molten glass during a specific immersion cycle (as will be detailed below.)

With reference to FIG. 3, the oblong core 4 comprises at least two longitudinal channels 7, for passing the conductive connecting wires 3 through.

Advantageously, the connecting wires 3 are accessible from the other end of the oblong core 4, and are then connected, using a weld or solder 8, to the winding 5 which is wound on the outer surface of the core 4. The connecting wires 3 are advantageously pre-shaped in a "Z" shape in order to better hold them in place inside the longitudinal channels by friction. FIG. 4 illustrates a partial view of a longitudinal channel 7 with a connecting wire 3 pre-shaped in a "Z" shape.

Figure 5:
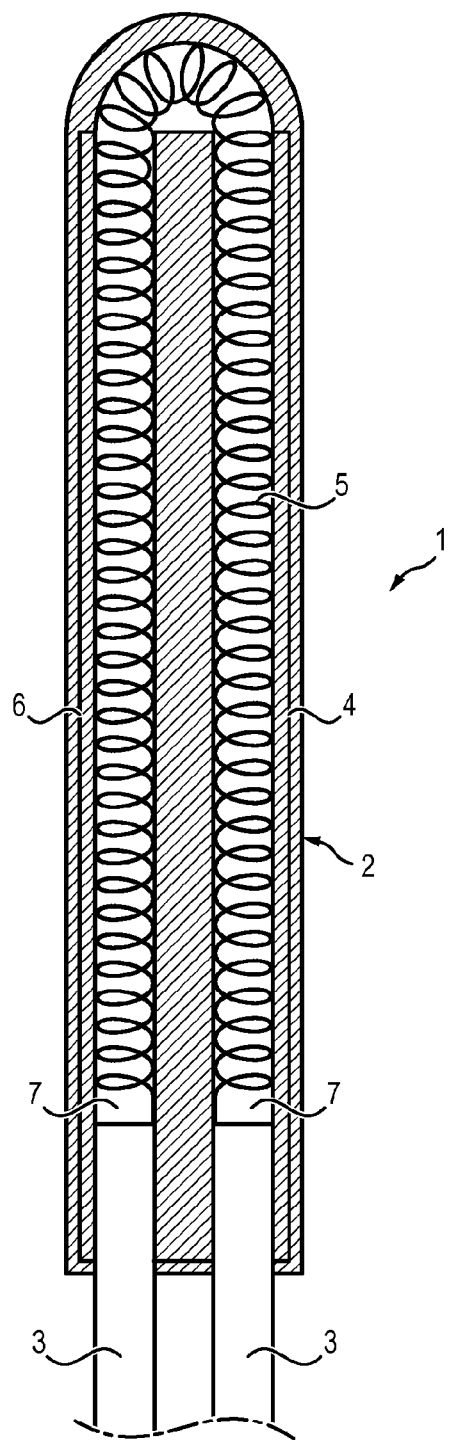
FIG. 5 illustrates a section view of a sensitive element according to the invention.

Alternatively, with reference to FIG. 5, the bifilar winding is "corkscrew" wound inside the longitudinal channels 7.

The connecting wires 3 as well as the winding 5 are preferably made of a noble metal such as platinum or palladium so that they do not oxidize at high temperature.

The core 4 is conventionally obtained by extrusion due to its oblong geometry.

As an illustration, the connecting wires 3 usually have a diameter in the order of one or five tenths of a millimeter, whereas the winding is composed of a platinum wire with a diameter in the order of ten to fifty micrometers.

Furthermore, the core 4 is typically ceramic and particularly yttriated or magnesiated (i.e. zirconium stabilized with a few percent of yttrium oxide or magnesium oxide.) As will be understood, this is the main structure of the sensitive element.

The material of the core 4 gives it the following properties.

It is mechanically resistant to withstand mechanical stresses (flexion, torsion, traction/compression, vibrations, shocks, etc.)

It is sufficiently electrically insulating to avoid disturbing the conductive winding (insulation resistance and dielectric strength.)

It withstands both operating temperatures (−260° C./+500° C.) but also temperatures involved as part of the immersion cycle (400° C. to 1200° C.).

It withstands operating thermal shocks (up to 150° C./s) but also the far more severe thermal shocks encountered during the immersion cycle (approximately 2000° C./s over a range of several hundred degrees Celsius).

The constraints it entails on the platinum winding by differential thermal expansion are negligible at the usual operating temperatures, the natural expansion of the platinum directly governs its electrical response ($R_T = \rho_T L_T / S_T$) and allows the sensitive element to closely obey the CALLENDAR—VAN DUSSEN law.

It is sufficiently thermally insulating to avoid disturbing the thermal measurement taken by the winding.

It is sufficiently thermally insulating to avoid transmitting the temperature of the attachment zone to the wound zone (axial thermal conduction.)

It has an optimal shape for allowing the winding to be as close as possible to the area to be measured (element encapsulated in a miniature body) or the fluid flow to in as much contact with the winding as possible (aerothermal flow around the element) so as to minimize its response time. In addition, its rotational shape prevents it from being sensitive to the angular orientation of the fluid flow.

Furthermore, the use of zirconium allows better thermomechanical performance in relation to the ceramic traditionally used for RTDs (Resistance Temperature Detector or Device): forsterites or aluminiums. This is because zirconium has particularly beneficial thermal properties: very low thermal conductivity and specific heat volume which causes, despite a relatively high mass per unit volume, a low thermal effusivity (good "thermal screen" because the capturing surface exchanges heat poorly), very low thermal diffusivity (good "thermal barrier" as the heat captured on the surface diffuses poorly into the material.) Stabilized zirconium also has superior mechanical characteristics: good mechanical resistance to flexion, relatively moderate Young modulus ("elastic" rather than "rigid" and "brittle" response). These good mechanical properties also make it possible to miniaturize the cores by further reducing the thicknesses.

Furthermore, zirconium has thermal expansion coefficients very close to the main metallic materials used in aeronautics for the winding (mainly platinum alloys), which minimizes disturbances of their electrical response with temperature.

Furthermore, although magnesium is very hydrophilic by nature, its use as stabilizer of the zirconium makes it possible to minimize the susceptibility of the latter to humid heat and to avoid leading to the transformation from the tetragonal crystalline phase to the monoclinic crystalline phase responsible for the destruction of the yttriated zirconiums, even without any external mechanical stresses, by swelling of approximately 3% per unit volume.

Another advantage of magnesiated zirconium is its color. The magnesium gives it an ochre color that becomes more pronounced as its content increases, whereas for example an yttriated zirconium is naturally white whatever its yttrium oxide content.

This color can thus be used as a simple and fast "visual indicator" of the crystallographic state of the ceramic following the manufacturing process.

Figure 6:
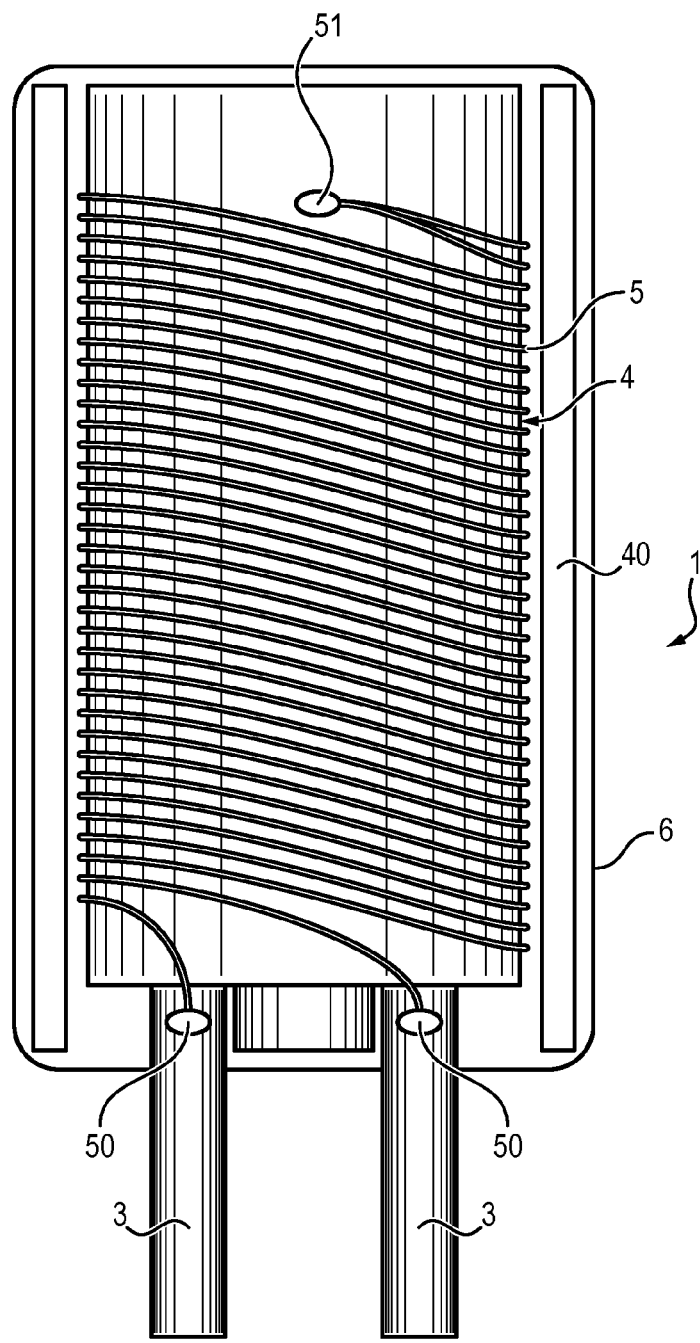
FIG. 6 illustrates a section view of a sensitive element according to the invention.

Alternatively or additionally, with reference to FIG. 6, the sensitive element 1 comprises a glass or ceramic tube 40 into which the core 4 is inserted with the winding 5 and the connecting wires 3. The tube 40 makes it possible to control the thickness of the coating 6 around the core 4. In particular, the tube 40 makes it possible to limit the thickness of this coating 6. In this case, the end of the core is stress-relieved to allow the longitudinal channels to show through. The winding is connected to the connecting wires 3 on the output side (the place where the connecting wires come out of the core 4) at two connection points 50 and connected in pairs at connection points 51 located on the core 4 with the desired resistive value on the opposite side.

Figure 7:
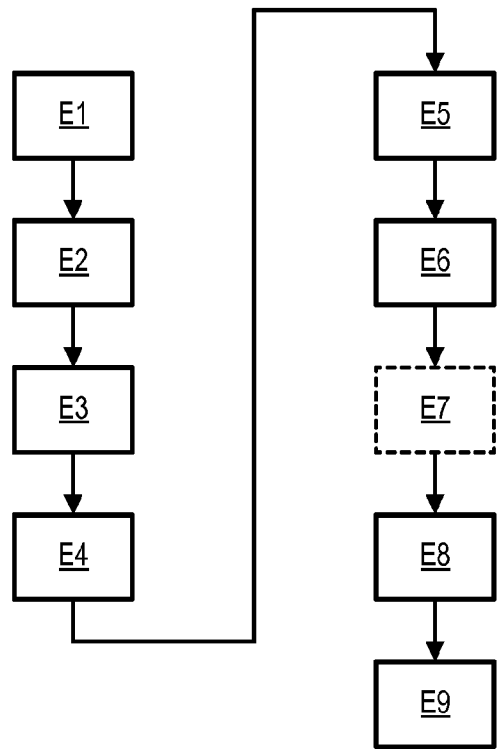
FIG. 7 illustrates the steps of a method for manufacturing a sensitive element according to the invention.
Figure 8:
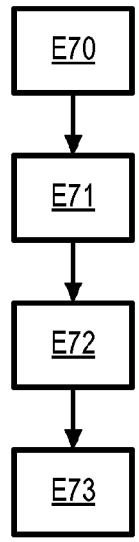
FIG. 8 illustrates the sub-steps of a method for manufacturing a sensitive element according to the invention.

There now follows a description of a method for fabricating a sensitive element according to an embodiment with reference to FIG. 7.

We start with an oblong core 4 comprising at least two longitudinal channels 7.

In a first step (step E1), conductive wires are wound around the core 4 to obtain the winding 5 of conductive wires wound around the outer surface of the core 4.

If the winding 5 is corkscrew, it is inserted into the longitudinal channels.

In a second step (step E2) the wound conductive wires 5 are bonded to the core 4 by means of refractive glass (slip of water and oxides applied by brush, dried then kiln-baked.) This step makes it possible to electrically regenerate the winding 5 by altering the crystallographic structure of the metal allow and allow for handling of the parts.

In a third step (step E3), the connecting wires are inserted into the inside of the longitudinal channels 7. The connecting wires are advantageously pre-shaped in a "Z" shape in order to improve their hold inside the longitudinal channels (see FIG. 4).

In a fourth step (step E4), the winding (5) is connected to the connecting wires 3 in order to form a resistive circuit sensitive to the physical parameter to be measured. As mentioned previously, this step is implemented by means of a solder or a weld 8.

In a fifth step (step E5), the connecting wires 3 are partially pre-bonded to the core 4 by means of a refractive glass or glass-ceramic (water and oxide slip applied by brush, dried then baked in a kiln.)

It is advantageously noted that this step of partial pre-bonding serves essentially to allow handling of the sensitive element during the manufacturing process but does not in any way contribute to the sealing of the wires 3 connecting to the core 4.

One may advantageously continue to a sixth step, at this stage in the process, to a calibration (step E6) of the electrical resistance of the winding by soldering the wires wound to the appropriate length in pairs.

At the end of the steps above, a pre-assembled sensitive element 10 is obtained composed of the core 4, the winding 5 and the connecting wires 3 and where applicable the tube 40. The pre-assembled sensitive element 10 is the sensitive element which will be modified to obtain the assembled sensitive element 10'.

Optionally regarding the sensitive element of FIG. 5, in a seventh step (step E7) it is possible here to insert the core 4 into the tube 40 (in FIG. 6 the step E7 is represented in dotted lines to show that it is optional.) In an eighth step (step E8), a single immersion cycle is implemented to continue, during this cycle, to the coating of the wound core by means of a layer of glass and to the final sealing of the connecting wires 3 in the longitudinal channels 7, in a single immersion, in molten glass at high temperature (400° C. to 1200° C.), of the core 4 of the pre-assembled sensitive element 10. It is specified here that the immersion of the pre-assembled sensitive element 10 is not total. Specifically, it is only the core 4 and its winding (internal or external to the core 4) which is totally immersed, only a tiny part of the connecting wires 3 is immersed (in the order of the millimeter or less.)

Furthermore, it is specified here that the term "immersion cycle" is here understood to mean a series of sub-steps particularly comprising the lowering of the sensitive element, the immersion in the molten glass as such, the extraction from the molten glass (sub-steps detailed below) and its controlled solidification. Furthermore, it is specified that following the immersion cycle, the core 4 is totally coated.

According to the invention the immersion cycle (step E8) during which the coating and the final sealing are done, advantageously comprises the following sub-steps described with reference to FIGS. 8 and 9a to 9e.

In a preliminary sub-step E70 the sensitive element 10 is attached at the end of a pair of tweezers (not represented).

In a sub-step E71, the pre-assembled sensitive element 10 is lowered quickly (i.e. a few centimeters, typically two to ten centimeters) into a kiln 60 until it is above the molten glass 51 at high temperature (that is to say in liquid form and at high temperature (400° C. to 1200° C.)) contained in a refractive crucible 50 (see FIG. 9a) in order to pre-heat the core 4 to avoid it cooling the glass 51 during the subsequent immersion, which would make it too viscous to be able to penetrate into the longitudinal channels 7 and seal the connecting wires 3 inside the longitudinal channels 7. Thus, the core 4 reaches a temperature that is between 75% and 95% of the temperature of the molten glass. The pre-assembled sensitive element 10 remains for a few tens of seconds above the molten glass for preference, typically one minute.

The glass is advantageously made from two main families of constituent:

Network formers:
Silica SiO2: inexpensive and having good resistance to thermal shocks. On the other hand, it has a melting temperature that is high (1650° C. to 1730° C. depending on the structure), it has a low thermal expansion coefficient and has low quenching strength.
Lead oxide PbO: has a low melting temperature (888° C.), provides a very fluid glass, has good quenching strength (very elastic.) On the other hand, it has poor hot electrical insulation characteristics (>250° C.).
Zinc oxide ZnO: increasingly used as a replacement for lead oxide, provides a fairly fluid glass, has good quenching strength. On the other hand, it has a high melting temperature (1975° C.) and has poor hot electrical insulation characteristics (>400° C.).
Boric anhydride $B_2O_3$: has a low melting temperature 450° C.), has good withstand to thermal shocks, has good quenching strength (elastic). On the other hand, it can break down and vaporize if supercooled despite a high boiling temperature (1860° C.), it has low expansion and has low resistance to chemical aggression (water, acids, etc.).
Phosphoric anhydride $P_2O_5$: has a low melting temperature (340° C.). On the other hand, it can vaporize too quickly if supercooled (boiling point at 360° C.).
Amorphous aluminium $Al_2O_3$: has high surface tensions, has good resistance to chemical aggression (water, acids, etc.), has good electrical insulation characteristics, has good thermal conductivity. On the other hand, it has a very high melting temperature (2054° C.), it is very viscous, and has low quenching strength.
Amorphous zirconium $ZrO_2$: has high surface tensions, has good resistance to chemical aggression (water, acids, etc.). On the other hand, it has a very high melting temperature (2715° C.), it is very viscous, it has poor hot electrical insulation characteristics (>500° C.) and has low thermal conductivity.

Note that amorphous aluminium and amorphous zirconium are difficult to use and expensive.

Network modifiers:
A first category comprises melters: they make it possible to modify the network, generally by weakening atomic or nuclear bonds, often to the detriment of the resistance to chemical aggression. They generally include alkaline oxides:
Soda Na2O: makes it possible to lower the melting temperature and viscosity.
Potassium oxide K2O: makes it possible to lower the melting and improves quenching withstand (increases the elasticity of the bonds.)
Amorphous magnesium oxide MgO: improves resistance to chemical aggression (water, acids etc.) and thermal conductivity.
Barium oxide BaO (an oxide very commonly used in enamels and ceramic glazes): lowers the melting temperature despite a high melting temperature of its own (1920° C.), improves quench withstand (greatly increases elasticity and mechanical strength) and surface hardness. On the other hand, it can break down and vaporize if supercooled despite a high boiling temperature (2000° C.).
Lead oxide PbO: lowers the melting temperature, increases fluidity, improves quenching strength (increases elasticity of the bonds.) but reduces the hot electrical insulation characteristics.
A second category is the stabilizers: they make it possible to stabilize or control the network weakened by the melters.
Calcium oxide CaO (the most commonly used "cheap" stabilizer): improves mechanical strength, improves resistance to chemical aggression (water, acids etc.) but increases the risks of recrystallization on annealing.
Zinc oxide ZnO (increasingly used as a replacement for lead oxide): it provides a fairly fluid glass with good quenching strength (very elastic.) On the other hand, it has a high melting temperature (1975° C.) and has poor hot electrical insulation characteristics (>400° C.).
Ferrous oxide $Fe_2O_3$: reduces hot electrical insulation characteristics. The greenish coloring can be "washed" with manganese oxide $MnO_2$ (also known as "glassmaker's soap".)
Lead oxide PbO: lowers the melting temperature, increases fluidity, improves quenching strength (increases the elasticity of the bonds) but reduces hot electrical insulation characteristics.

The glass and in particular its method of fabrication (the assembly) of the latter will be chosen so as to obtain a glass with:
- A thermal expansion coefficient compatible with the ceramic core, the winding and the linking wires, a compromise between the outer glaze and the inner seal;
- A viscosity and surface tension compatible with the process;
- A melting temperature sufficiently high in relation to the operating temperatures of the element but sufficiently low to limit mechanical stress on the core and the winding;
- Good quenching strength to avoid spalling or crazing;
- Suitability for annealing at low temperature;
- Good resistance to chemical aggression (water, acids, bases, ester phosphates, etc.);
- Good shear strength for the sealing of the connecting wires;
- Good chemical adhesion to the ceramic core and the connecting wires;
- No chemical aggression harmful to the ceramic core and the metal wires.

By way of example, the glass can be composed of
- approximately 15% only of silica;
- a high lead oxide content of over 70%;
- a high boron oxide content of over 10%.

Simultaneously with the pre-heating of the core 4, the latter undergoes cleaning by pyrolysis because of the heat prevailing in the kiln 60. Thus, the core 4 is cleansed of organic pollution (sebum from the hands, etc.) which guarantees the repeatability of the adhesion of the glass to the core 4 and the winding 5.

Figure 9A:
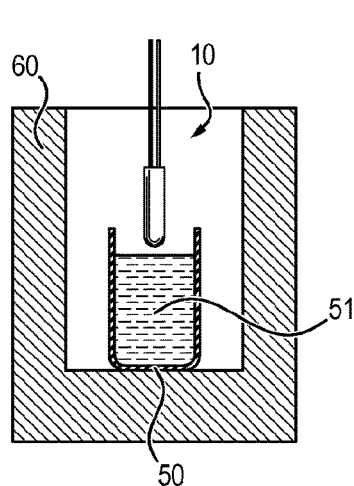
FIGS. 9a to 9e illustrate the implementation of the sub-steps described with reference to FIG. 8.
Figure 9B:
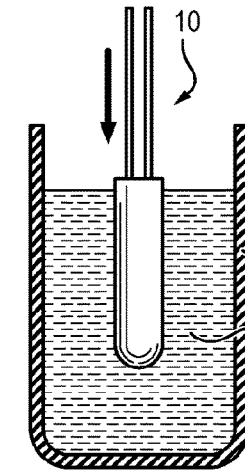

In a sub-step E72, the core 4 of the pre-assembled sensitive element 10 is partially immersed in the molten glass 51 (see FIG. 9b). The term "partially immersed" is understood to mean, as can be seen in FIG. 9b, that the core 4 is almost totally immersed (to approximately 90% of its length.)

The partial immersion is carried out slowly (a few millimeters per second typically between two and ten millimeters per second) and the core 4 is left thus immersed for the time it takes the channels to fill (typically in the order of a minute.)

This partial immersion of the core 4 makes it possible to:
- Gradually finish bringing the core 4 to the same temperature as the molten glass 51 by a sufficiently slow partial immersion;
- Avoid trapping microbubbles of air between the turns of the winding 3 owing to the sufficiently slow partial immersion;
- fill the longitudinal channels 7 by capillarity by letting the air escape freely via the non-immersed part of the core 4 (the molten glass is too viscous to let the air escape);
- ensure optimal attachment of the glass owing to the highly aggressive molten glass chemically attacking the surface layer of the materials (metallic and ceramic);
- continue the electrical regeneration of the wound wires 3 initiated during baking of the bonding to the refractive glass (see step E2).

Figure 9C:
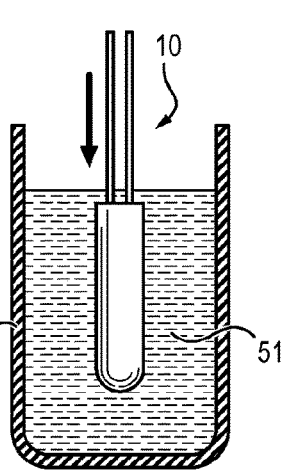
Figure 9D:
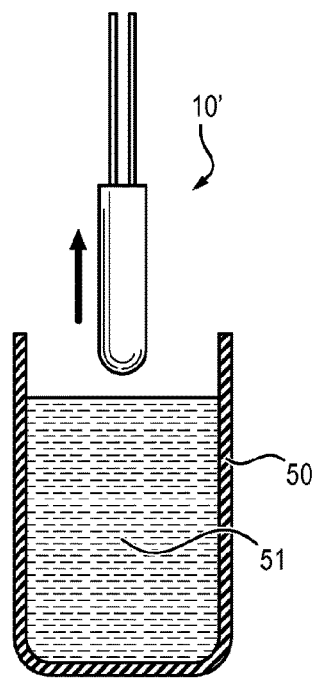

In a sub-step E73 the core 4 is completely immersed in the molten glass and the core 4 is thus left completely immersed for a few minutes in the molten glass 51 (see FIG. 9c). As explained previously only a tiny part of the connecting wires external to the core 4 is immersed.

Following this step E73, the assembled sensitive element 10' is obtained (not however finalized, but with the desired structure.)

In a sub-step E74, after complete immersion of the core 4, the assembled sensitive element 10' is slowly raised (see FIG. 9d) in order to bring the core 4 slowly out of the molten glass 51. The term "slowly raised" is understood to refer to a raising speed of a few millimeters per second, typically between two and ten millimeters per second.

The raising speed is important because it has, besides the characteristics of molten glass (viscosity, surface tension, mass per unit volume) a direct effect on the regularity of the thickness of the glass layer coating the core 4.

Similarly, the filling of the longitudinal channels 7 is determined by the same phenomena above with in addition the dimensions of the channels (length, diameter), the capillarity and the thermal expansion of the glass (volume retraction upon solidification then upon its cooling.)

Figure 9E:
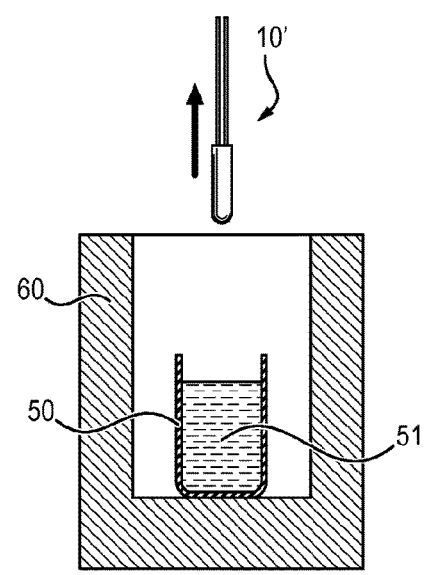

Finally, in a sub-step E75, the assembled sensitive element 10' is raised quickly in order to quickly bring the core 4 out of the kiln 60 (see FIG. 9e). The term "quick raise" is understood to mean a rising speed two to ten times quicker than the slow raising speed.

The quick withdrawal of the core 4 from the assembled sensitive element 10' is important given the vertical position of the core 4, the liquid glass deposited on the core 4 during the coating has a natural tendency to sag and form:
- a drop on the lower part (excessive diameter);
- an irregular thickness between the top and the bottom of the core.

Consequently, the speed of taking out has its importance because the glass must be set as quickly as possible around the core 4 to limit these effects.

The glass layer obtained for the complete coating of the core is very dense, while remaining amorphous and therefore transparent. This transparence among other things allows for an easy control of the quality of the coating (microbubbles between the wound wires) as well as the spacing between the wound wires, vouching for the dielectric properties between circuits for example.

Furthermore, as the coating is done on hot parts, pyrolyzed and with highly reactive molten glass, the adhesion between the glass and the core is greatly improved.

Once out of the kiln, in an eighth step (step E9), the electrical behavior of the assembled sensitive element is then stabilized by stress-relieving the coating during an annealing of the glass at a temperature below the glass transition temperature of the glass in order to obtain the final sensitive element.

This step of stress-relieving (step E9) is important in the sense that, following the immersion cycle, the glass layer quickly sets on the still-hot refractive core (4). When the latter cools in turn, it shrinks, which compresses the glass in its thickness (core quench effect) and stretches it at the glass/core interface. The glass used must therefore be sufficiently "elastic" to temporarily bear these constraints without spalling.

During this stress-relieving step (step E9), the thermal annealing has the aim of the relaxing the residual stresses stored in the glass to stabilize the electrical behavior of the platinum winding over time. Note that in a manner known per se, the thermal expansion of the platinum is electrically characterized by CALLENDAR—VAN DUSSEN's law. Thus, if the glass then compresses or expands the platinum by differential thermal expansion, the electrical response of the platinum is falsified.

Furthermore, the residual stresses stored in the glass upon cooling also then falsify the response of the platinum winding in the same way. With typical hyper-viscous fluid behavior, the glass is capable of molecular micro-motion over time if it is subjected to mechanical stresses (like the Sea of Ice under its own weight). This means that over time, the glass will be capable of relaxing its internal stresses "by itself", thereby altering its initial electrical characteristics.

Consequently during the stress-relieving step, the annealing is carried out at a temperature below the glass transition temperature. The lower the temperature, the lower the risk of recrystallizing the amorphous glass. However, if the temperature is too low, the viscosity of the glass will require years to relieve the stresses. Note that for the glassmaking industry, the quench limit is generally characterized by an exposure of approximately one hour at the standardized temperature known as the "lower annealing temperature" where the glass has a viscosity of $10^{14,5}$ poises (it would require in the order of 18 months to stress-relieve a glass of $10^{19}$ poises).

In the context of the invention the thermal annealing lasts for several days at a temperature deliberately lower than the standardized annealing limit temperature (typically in the order of 250° C. to 500° C.) so as to completely dispel the risks of electrical drift over time, at the operating temperatures for which the sensitive elements are designed (generally between −100° C. and +400° C.).

The method described above has the advantage that steps E5, E7, E8 and E9 require less than a quarter of an hour of qualified workforce unlike the known techniques which required the repetition by hand of a certain number of steps to seal the connecting wires and coat the core.

The sensitive element obtained using the method of the invention retains for the most part the good mechanical properties arising from the ceramic core (mechanical resistance in flexion, compression and traction, rigidity under vibration, etc.) while adding the characteristics of the glass of the coating layer (high densification of the glass, very good adhesion of the glass to the ceramic core, watertightness, hardness, resistance to wear, resistance to chemical aggression, high dielectric, high insulation resistance, etc.)

Furthermore, the sensitive element above is advantageously used in a heavily stressed device for measuring a physical parameter of a fluid flow.

The invention claimed is:

1. A method for manufacturing an element sensitive to at least one physical parameter of a fluid flow, comprising a single immersion cycle (E7) making it possible for a pre-assembled sensitive element (10) to become an assembled sensitive element (10'), the single immersion cycle (E7) comprising immersion of a core (4) of the pre-assembled sensitive element (10) in molten glass (51), said molten glass being glass in liquid form at a temperature between 400° C. to 1200° C., said core (4) comprising at least two longitudinal channels (7) through which pass longitudinally at least two conductive connecting wires (3) connecting to an at least bifilar winding (5), said winding (5) being suitable for forming a resistive or inductive circuit for detecting said physical parameter, said immersion making it possible to seal the connecting wires (3) inside the channels (7), fill said channels and coat the outside of the core in a single immersion, the core being, at the end of said single immersion cycle, sealed and coated, the single immersion cycle comprising a step (E72) of partial immersion, at a first speed, of the core (4) in the molten glass followed by a step (E73) of complete immersion, at a second speed faster than the first speed, of the core (4) in the molten glass, wherein during the step of partial immersion the core (4) is left partially immersed for a duration so that said channels are filled by letting the air escape freely via the non-immersed part of the core.

2. The method according to claim 1, wherein the bifilar winding is wound on the outer surface of the core (4), the immersion making it possible to coat the outside of the core (4) thus wound.

3. The method according to claim 1, wherein the winding is corkscrew wound inside the longitudinal channels (7), the immersion making it possible to hold the connecting wires in place on the winding and control the space between the turns of the winding.

4. The method according to claim 1, wherein the pre-assembled sensitive element comprises a tube (40) surrounding the core (4), said tube (40) being preferably made of glass or ceramic, said tube making it possible to control the minimum thickness of the coating during immersion.

5. The method according to claim 1, wherein the single immersion cycle comprises a step (E71) of pre-heating and cleaning of the pre-assembled sensitive element (10) consisting in positioning said pre-assembled sensitive element (10) close to the molten glass without immersing said pre-assembled sensitive element (10) in such a way that the molten glass heats the pre-assembled sensitive element (10) so that it reaches a temperature between 75% and 95% of the temperature of the molten glass.

6. The method according to claim 1, wherein the single immersion cycle comprises a step (E74) of slow extraction of the core (4) from the molten glass followed by a step (E75) of quick extraction of the core from the hot area of the kiln.

7. The method according to claim 1, comprising, following the step consisting in a single immersion cycle (E7), a step (E8) of stabilization of the electrical behavior of the assembled sensitive element (10') by stress-relieving by annealing the glass at a controlled temperature in order to obtain the final sensitive element.

8. The method according to claim 1, wherein the connecting wires and the winding are made of platinum alloy and the core is made of partially or totally stabilized zirconium.

9. The method according to claim 1, wherein the molten glass has a temperature of 950° C.

* * * * *